US009472980B2

(12) United States Patent
Zhou (10) Patent No.: US 9,472,980 B2
(45) Date of Patent: Oct. 18, 2016

(54) INTEGRATED BUCK/BOOST BATTERY MANAGEMENT FOR POWER STORAGE AND DELIVERY

(71) Applicant: Xunwei Zhou, Milpitas, CA (US)

(72) Inventor: Xunwei Zhou, Milpitas, CA (US)

( * ) Notice: Subject to any disclaimer, the term of this patent is extended or adjusted under 35 U.S.C. 154(b) by 399 days.

(21) Appl. No.: 13/907,511

(22) Filed: May 31, 2013

(65) Prior Publication Data

US 2013/0320932 A1    Dec. 5, 2013

Related U.S. Application Data

(60) Provisional application No. 61/654,331, filed on Jun. 1, 2012.

(51) Int. Cl.
*H02J 7/00* (2006.01)
*H02J 7/35* (2006.01)
*H02J 7/02* (2016.01)

(52) U.S. Cl.
CPC .. *H02J 7/35* (2013.01); *H02J 7/00* (2013.01); *H02J 7/0052* (2013.01); *H02J 7/0063* (2013.01); *H02J 7/022* (2013.01); *Y10T 307/696* (2015.04)

(58) Field of Classification Search
CPC .................................................. H02J 7/0052
USPC ........................................................ 320/136
See application file for complete search history.

(56) References Cited

U.S. PATENT DOCUMENTS

| 8,872,487 | B2 * | 10/2014 | Belloni | H05B 33/0815 323/259 |
| 2011/0273130 | A1 * | 11/2011 | Lee | H01M 10/465 320/101 |
| 2012/0043818 | A1 * | 2/2012 | Stratakos | H02J 3/383 307/77 |
| 2012/0175963 | A1 * | 7/2012 | Adest | H02J 1/102 307/82 |

* cited by examiner

*Primary Examiner* — Robert Grant
*Assistant Examiner* — Harry O'Neill-Becerril
(74) *Attorney, Agent, or Firm* — Kunzler Law Group, PC (57) ABSTRACT

For managing a battery, an apparatus includes a first switch electrically connected to a first connection and a second connection. At least one of a load and a power supply is electrically connected the first connection. In addition, an inductor is electrically connected to the second connection. A second switch is electrical connected to the first connection and electrically connected to the common. The third switch is electrically connected to a third connection and electrically connected to the battery. The fourth switch is electrically connected to the third connection and electrical connected to the common. The inductor is also electrical connected the third connection.

12 Claims, 13 Drawing Sheets

INTEGRATED BUCK/BOOST BATTERY MANAGEMENT FOR POWER STORAGE AND DELIVERY

CROSS-REFERENCE TO RELATED APPLICATIONS

This application claims priority to U.S. Provisional Patent Application No. 61/654,331 entitled "INTEGRATED BATTERY MANAGEMENT SYSTEM AND METHOD" and filed on Jun. 1, 2013 for Xunwei Zhou, which is incorporated herein by reference.

FIELD

The subject matter disclosed herein relates to battery management and more particularly relates to integrated battery management.

BACKGROUND

Description of the Related Art

Batteries are often used to store electrical energy. A battery may be charged when a power supply is available. For example, the battery may be charged from a solar panel array during daylight hours or from the electrical grid while an electric car is parked. The battery may also be discharged to power a load, such as to supply electricity from solar and/or wind sources while electricity is not being generated or when the electric car is being driven. Unfortunately, the circuits required to manage the charging, discharging, and protection of a battery can be expensive and inefficient.

BRIEF SUMMARY

An apparatus for battery management is disclosed. The apparatus includes a first switch, a second switch, a third switch, and a fourth switch. The first switch is electrically connected to a first connection and a second connection. At least one of a load and a power supply is electrically connected to the first connection. In addition, an inductor is electrically connected to the second connection. The second switch is electrically connected to the first connection and electrically connected to the common. The third switch is electrically connected to a third connection and electrically connected to a battery. The fourth switch is electrically connected to the third connection and electrically connected to the common. The inductor is also electrically connected to the third connection. A method and system also perform the functions of the apparatus.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects. Furthermore, aspects of the present invention may take the form of a computer program product embodied in one or more computer readable medium(s) having program code embodied thereon.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

The description of elements in each Figure may refer to elements of proceeding Figures Like numbers refer to like elements in all Figures, including alternate embodiments of like elements.

Figure 1:
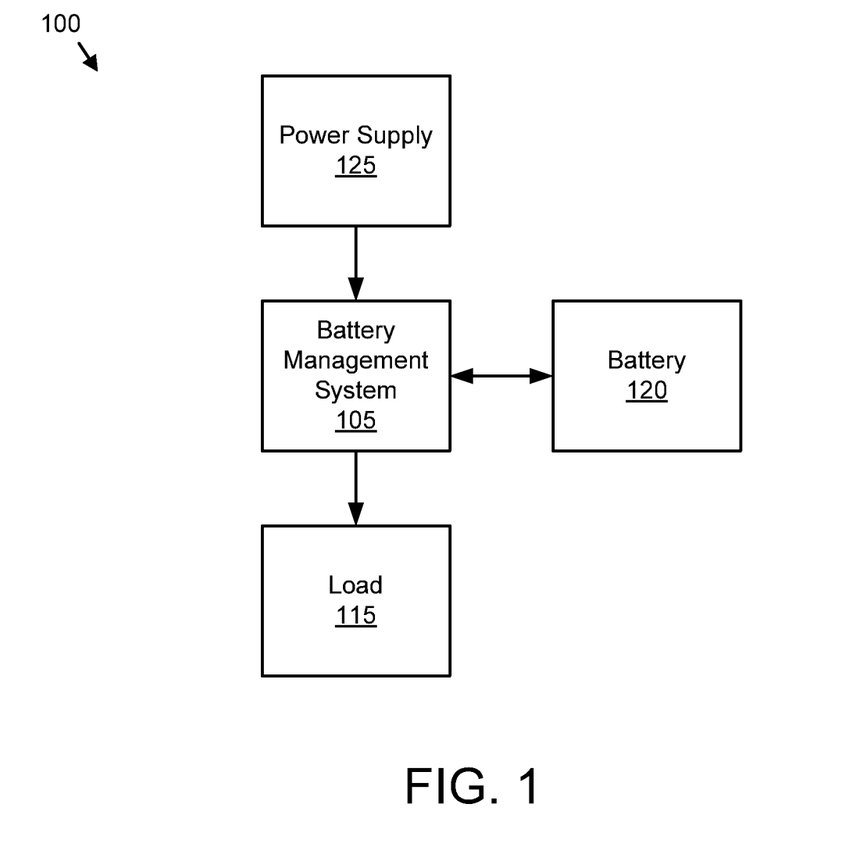
FIG. 1 is a schematic block diagram illustrating one embodiment of a battery system.

FIG. 1 is a schematic block diagram illustrating one embodiment of a battery system 100. The system 100 includes a power supply 125, a battery management system 105, a battery 120, and a load 115.

The power supply 125 may be an electrical grid. Alternatively, the power supply 125 may be an alternator driven by the motor of a hybrid automobile, a solar panel array, a wind turbine, a hydraulic turbine, a wave powered generator, or combinations thereof.

The battery 120 may be a wet cell battery such as a Leclanche cell, a Grove cell, a Bunsen cell, a Chromic acid cell, a Clark cell, and a Weston cell. Alternatively, the battery 120 may be a dry cell such as a zinc carbon cell. In one embodiment, the battery 120 is a molten salt battery.

The load 115 may be the electrical power grid, the motor of an electric car and/or hybrid car, a home electrical system, and the like. In one embodiment, the power supply 125, the battery 120, and the load 115 each operate at different voltages.

The battery management system 105 manages the charging and discharging of the battery 120. For example, the battery management system 105 may direct the flow of electricity to charge the battery 120 from the power supply 125 when electricity from the power supply 125 is available. Similarly, the battery management system 105 may direct the flow of electricity to discharge the battery 122 and drive the load 115 when no electricity is available from the power supply 125.

In addition, the battery management system 105 may modify the voltage of the electric power flowing from the power supply 125 to the battery 120 and from the battery 120 to the load 115 to match the operating requirements of the battery 120 and the load 115.

Prior to the disclosure of the new embodiments included herein, battery management systems 105 that performed these functions typically required four or more power switches switching the current in series in order to both charge and discharge the battery 120, as well as modify the voltage of the electric power flowing from the power supply 125 to the battery 120 and to modify the voltage of electric power flowing from the battery 122 the load 115. Unfortunately, using such a large number of power switches significantly reduces the efficiency of the battery management system 105.

The embodiments described herein manage the charging and discharging of the battery 120, along with modifying the voltages of the electric power, using only two switching power switches. As a result, the efficiency of the battery management system 105 is significantly increased over that of a conventional counterpart occurring prior to the disclosure of the embodiments as will be discussed hereafter.

Figure 2:
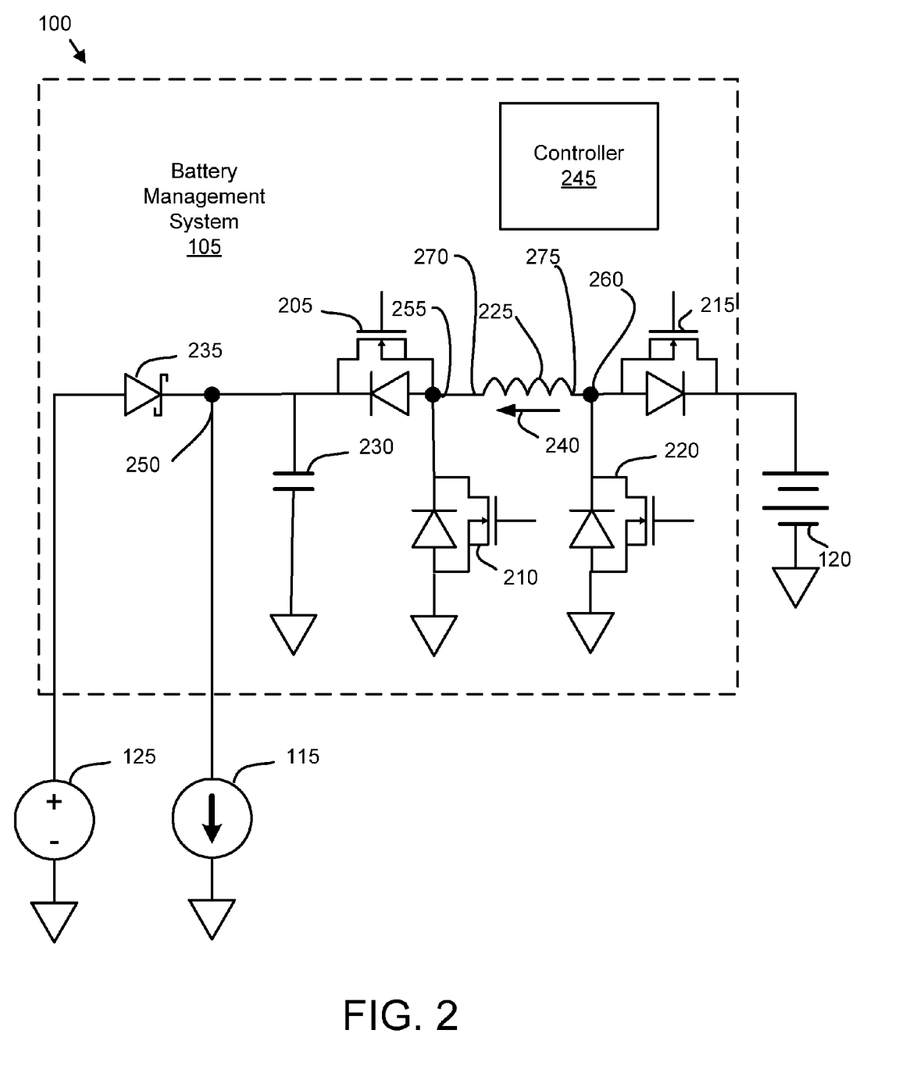
FIG. 2 is a schematic drawing illustrating one embodiment of a battery system.

FIG. 2 is a schematic drawing illustrating one embodiment of a battery system 100. The system 100 includes the power supply 125, the battery management system 105, the battery 120, and the load 115 of FIG. 1. The battery management system 105 includes a controller 245, a Schottky diode 235, a first connection 250, a second connection 255, a third connection 260, a capacitor 230, an inductor 225, a first switch 205, a second switch 210, a third switch 215, and a fourth switch 220.

In one embodiment, the switches 205, 210, 215, 220 are metal-oxide-semiconductor field-effect transistors (MOSFET). The MOSFET switches may be enhancement mode N Channel MOSFET. Each switch 205, 210, 215, 220 may have a switch drain, a switch source, and a gate as will be described hereafter.

The first switch 205, referred to in FIGS. 3-6 and 11-12 as Q1, is electrically connected to the first connection 250. In one embodiment, the switch drain of the first switch 205 is electrically connected to the first connection 250. In addition, the Schottky diode 235 and an input of the load 115 may be electrically connected to the first connection 250. The power supply 125 may also be electrically connected to the first connection 250 through the Schottky diode 235.

This first switch 205 is also electrically connected to the second connection 255. In one embodiment, the switch source of the first switch 205 is electrically connected to the second connection 255. The inductor 225 is also electrically connected to the second connection 255. In one embodiment, a proximal end 270 of the inductor 225 is electrically connected to the second connection 255.

The second switch 210, referred to in FIGS. 3-6 and 11-12 as Q2, is electrically connected to the first connection 250. In one embodiment, the switch source of the second switch 210 is electrically connected to the first connection 250. The second switch 210 is also electrically connected to a common. In one embodiment, the switch source of the second switch 210 is electrically connected to the common.

The third switch 215, referred to in FIGS. 3-6 and 11-12 as Q3, is electrically connected to the third connection 260. In one embodiment, a switch source of the third switch 215 is electrically connected to the third connection 260. In addition, the third switch 215 is electrically connected to the battery 120. A switch drain of the third switch 215 may be electrically connected to the battery 120.

The fourth switch 220, referred to in FIGS. 3-6 and 11-12 as Q4, is electrically connected to the third connection 260. In one embodiment, a switch drain of the fourth switch 220 is electrically connected to the third connection 260. In addition, the fourth switch 220 is electrically connected to the common. In one embodiment, the switch source of the fourth switch 220 is electrically connected to the common. A distal end 275 of the inductor 225 is also electrically connected to with the third connection 260.

The inductor 225 in combination with the switches 205, 210, 215, 220 may form a buck converter or a boost converter to decrease or increase the current 240 through the inductor 225. As a result, the battery management system 105 may decrease or increase the current 240 while charging the battery 120 from the power supply 125. In addition, the battery management system 105 may decrease or increase the current 240 while discharging the battery 120 to the load 115.

The battery management system 105 decreases or increases the current 240 while either charging or discharging the battery 120 by alternating switching only two of the switches 205, 210, 215, 220 on and off as will be described hereafter. As a result, charging and discharging operations are performed with increased efficiency.

Figure 3:
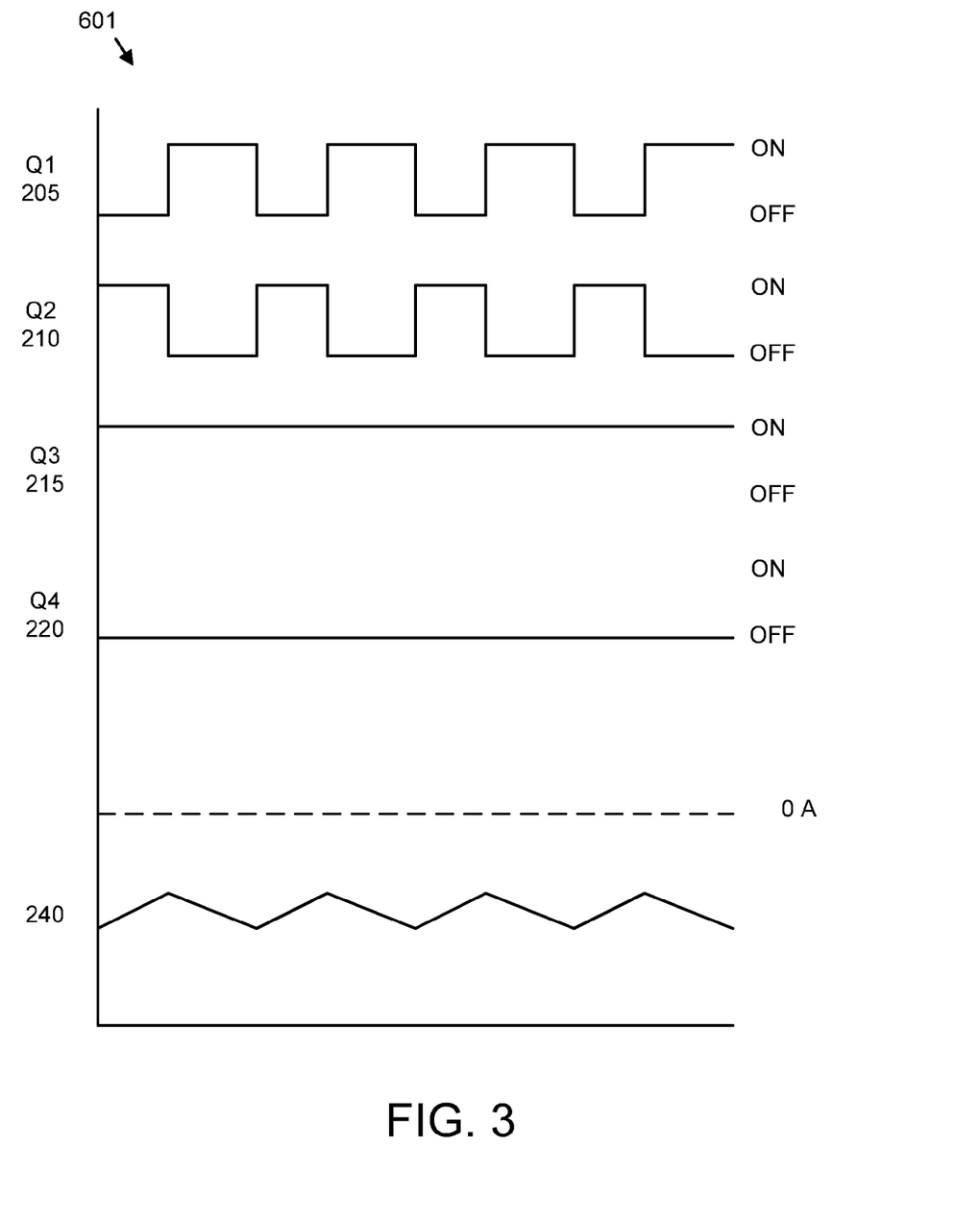
FIG. 3 is a diagram illustrating one embodiment of switch states and current flow while charging a battery.

FIG. 3 is a diagram illustrating one embodiment of switch states and current flow while charging a battery 601. In the depicted embodiment, the first switch 205 and the second switch 210 alternately switch on, with the first switch 205 being on while the second switch 210 is off and the first switch 205 being off while the second switch 210 is on. The first switch 205, second switch 210, and inductor 225 function as a buck converter, reducing the voltage of the power supply 125 as the current 240 flows from the power supply 125 to the battery 120. The current 240 is shown as a negative current, as the direction of the flow is opposite that shown for the current 240 in FIG. 2.

The third switch 215 is on to facilitate the flow of the current 240 to the battery 120. The fourth switch 220 is off. As a result, the voltage of the power supply 125 is efficiently reduced to a voltage appropriate for the battery 120. In addition, the conversion of the voltage and the routing of the current 240 to the battery 120 is performed efficiently as only the first switch 105 and the second switch 110 alternately switch on.

In one example, the power supply 125 may be the electrical grid. The alternating current of the electrical grid may be converted into direct-current with a higher voltage than the voltage of the battery 120. The depicted embodiment may be employed to reduce the voltage of the power supply 125 while charging the battery 120.

Figure 4:
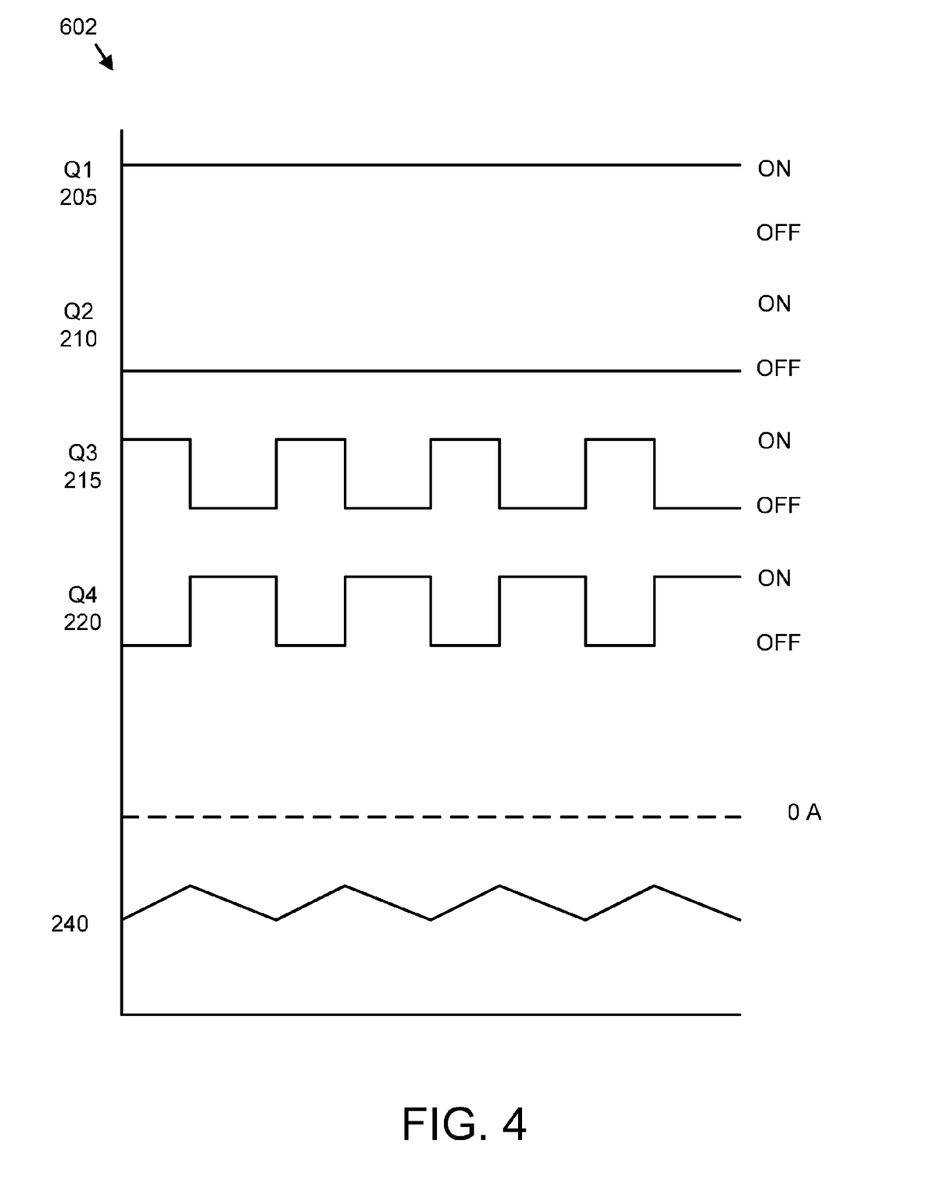
FIG. 4 is a diagram illustrating one alternate embodiment of switch states and current flow while charging a battery.

FIG. 4 is a diagram illustrating one alternate embodiment of switch states and current flow while charging a battery 602. In the depicted embodiment, the third switch 215 and the fourth switch 220 alternately switch on, with the third switch 215 being switched on while the fourth switch 220 is switched off, and with the third switch 215 being switched on while the fourth switch 220 is switched off. The third switch 215, the fourth switch 220, and the inductor 225 form a boost converter, increasing the voltage of the power supply 125 as the current 240 flows from the power supply 125 to the battery 120.

For example, the power supply 125 may be a low-flow hydraulic turbine. The turbine may have a lower operating voltage than that of an operating voltage of the battery 120. The depicted embodiment may be employed to increase the voltage of the turbine power supply 125 in order to charge the battery 120. The battery 120 is more efficiently charged as only the third switch 215 and the fourth switch 220 alternately switch on.

Figure 5:
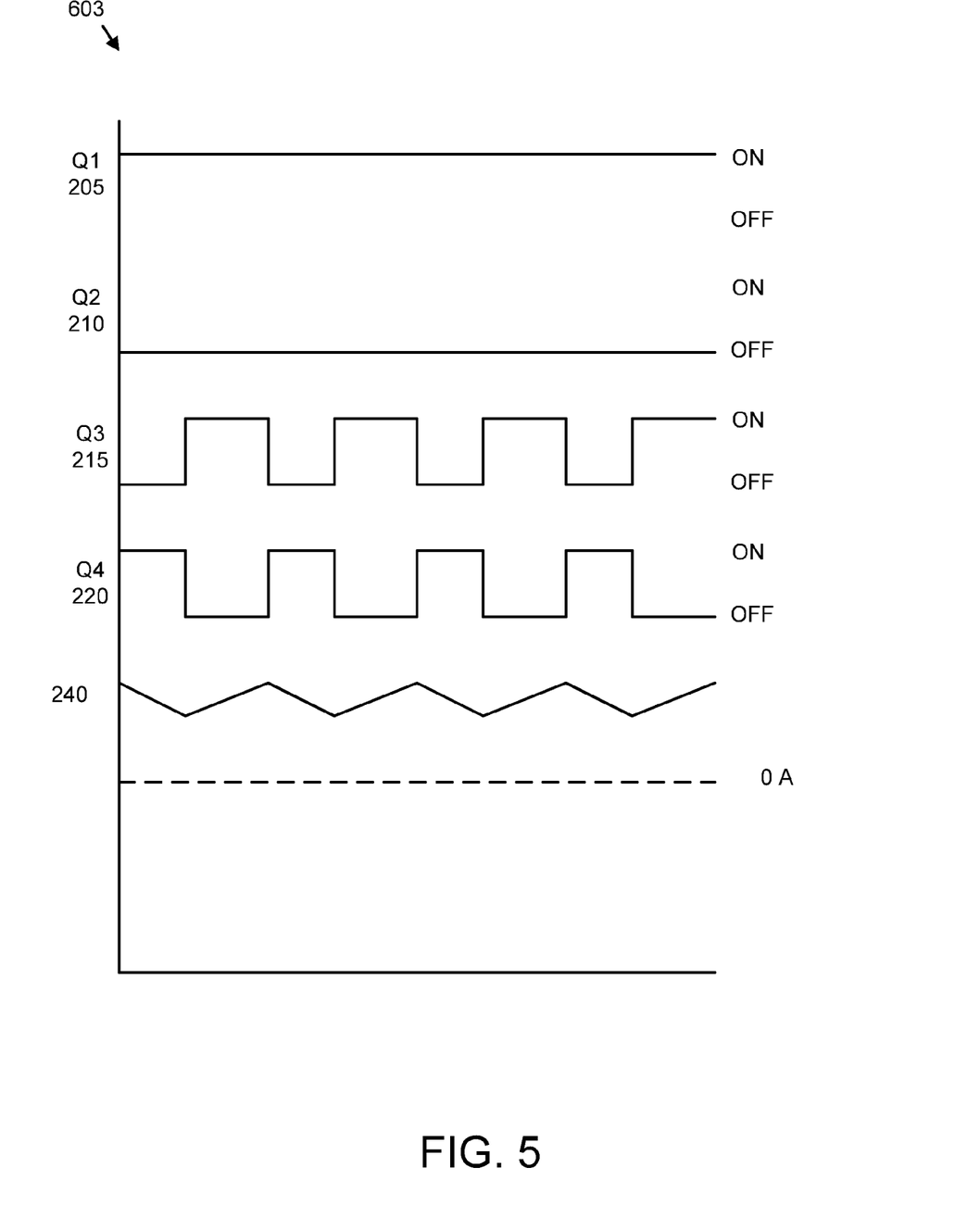
FIG. 5 is a diagram illustrating one alternate embodiment of switch states and current flow while discharging a battery.

FIG. 5 is a diagram illustrating one alternate embodiment of switch states and current flow while discharging a battery 603. In the depicted embodiment, the third switch 215 and the fourth switch 220 alternately switch on, with the third switch 215 being switched on while the fourth switch 220 is switched off and with the third switch 215 being switched off while the fourth switch 220 is switched on. The first switch 205 is always switched on while the second switch 210 is always switched off. The third switch 215, the fourth switch 220, and the inductor 225 function as a buck converter to decrease the current 240 supplied to the load 115.

For example, the battery 120 may comprise a plurality of cells in series. The load 115 may be a motor. If the operating voltage of the motor is less than the voltage of the battery 120, the depicted embodiment may be employed to reduce the current 240 that is supplied to the motor load 115 from the battery 120.

Figure 6:
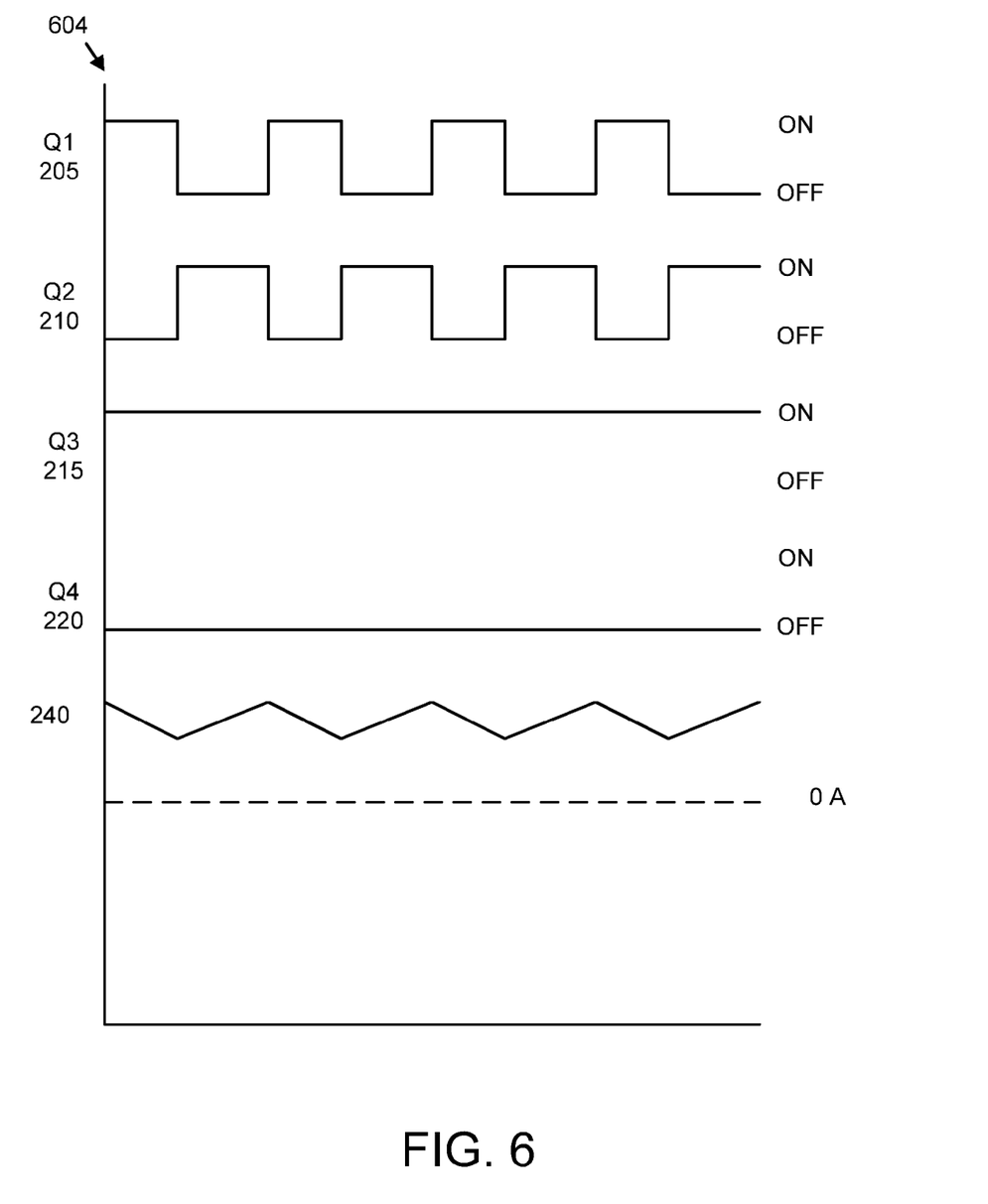
FIG. 6 is a diagram illustrating one alternate embodiment of switch states and current flow while discharging a battery.

FIG. 6 is a diagram illustrating one embodiment of switch states and current flow while discharging a battery 604. In the depicted embodiment, the first switch 205 and the second switch 210 alternately switch on, with the first switch 205 being on while the second switch 210 is off and the first switch 205 being off while the second switch 210 is on. The third switch 215 is always on while the fourth switch 220 is always off. The first switch 205, second switch 210, and inductor 225 function as a boost converter that supply the current 240 to the load from the battery 120.

For example, the battery 120 may be a flow battery and the load 115 may be the electrical grid. The current 240 may be converted from direct-current to alternating current. In addition, a lower voltage of the flow battery may be increased to a higher voltage compatible with the electrical grid.

Figure 7:
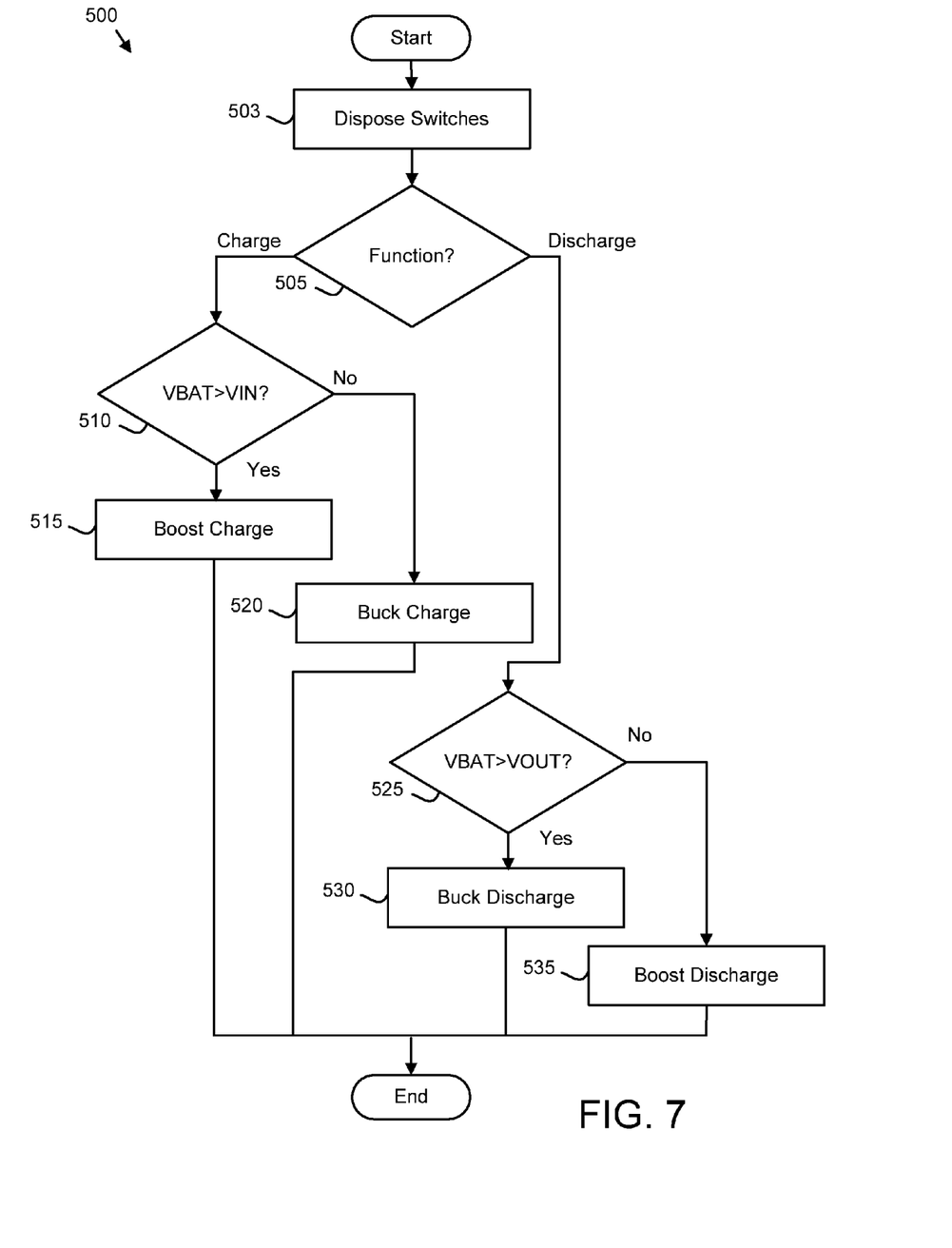
FIG. 7 is a schematic flow chart diagram illustrating one embodiment of a battery management method.

FIG. 7 is a schematic flow chart diagram illustrating one embodiment of a battery management method 500. The method 500 may be performed by the battery system 100 and the battery management system 105 of FIGS. 1-6.

The method 500 starts, and in one embodiment, the switches 205, 210, 215, and 2220 are disposed 503 as described for FIG. 2. The controller 245 may determine 505 the function for the battery management system 105. The controller 245 may determine 505 that the power supply 125 is to charge the battery 120. Alternatively, the controller 245 may determine 505 that the battery 120 is to be discharged to drive the load 115.

In one embodiment, the controller 245 determines 505 the function based on input such as a signal and/or command. Alternatively, the controller 245 may detect a target voltage for the power supply 125 and determine 505 to charge the battery 120 in response to the target voltage. In a certain embodiment, the controller 245 may detect a change in the current 240 to the load 115 and determine 505 to discharge the battery 120 in response to the change of the current 240.

In response to determining 505 a charge function, the controller 245 may determine 510 if the voltage of the battery 120 (VBAT) is greater than the voltage of the power supply 125 (VIN). If the VBAT is greater than VIN, the controller 245 may control the switches 205, 210, 215, 220 to operate as a boost converter for boost charging 515 the battery 120 as illustrated in FIG. 4 and the method 500 ends. If the VBAT is less than or equal to VIN, the controller 245 may control the switches 205, 210, 215, 222 to operate as a buck converter for buck charging 520 the battery 120 as illustrated in FIG. 3 and the method 500 ends.

In response to determining 505 a discharge function, the controller 245 may determine 525 if VBAT is greater than the operating voltage of the load 115 (VOUT). If VBAT is greater than VOUT, the controller 245 may control the switches 205, 210, 215, 220 to operate as a buck converter for buck discharging 530 the battery 120 to drive the load 115 as depicted in FIG. 5 and the method 500 ends. Alternatively, if VBAT is less than or equal to VOUT, the controller may control the switches 205, 210, 215, 222 to operate as a boost converter for boost discharging 535 the battery 120 to drive the load 115 as depicted in FIG. 6 and the method 500 ends.

Figure 8:
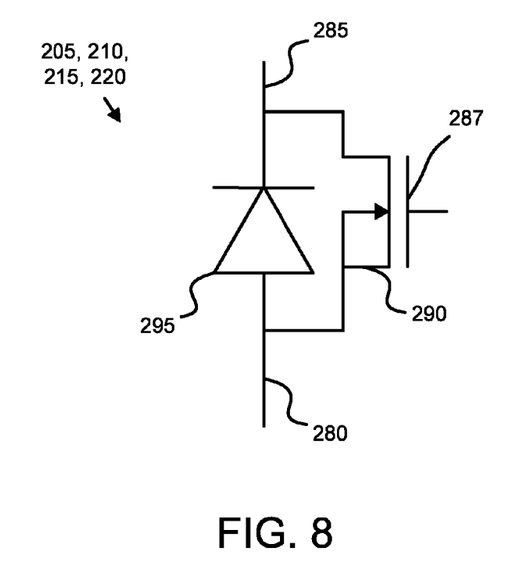
FIG. 8 is a schematic drawing illustrating one embodiment of a switch.

FIG. 8 is a schematic drawing illustrating one embodiment of a switch 205, 110, 215, 220. In one embodiment, the switch 205, 110, 215, 220 includes a switch drain 285, a switch source 280, a gate 287, a Field Effect Transistor (FET) 290, and a diode 295. The gate 287 of the FET 290 may be controlled by the controller 245. In one embodiment, the controller 245 asserts a control signal to activate the FET 290. Alternatively, the controller 245 de-asserts a control signal to activate the FET 290. The diode 295 may control the direction of the current flow through the switch 205, 110, 215, 220.

Figure 9:
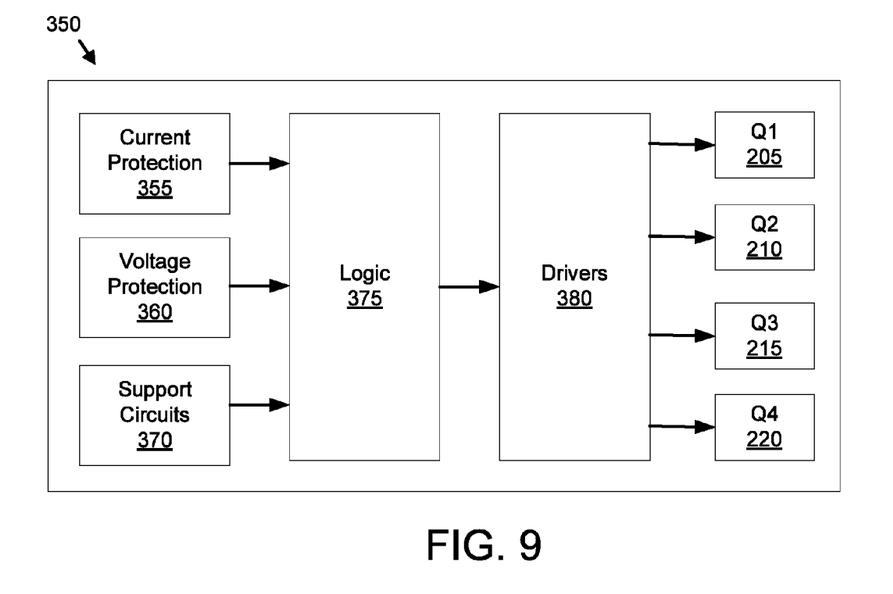
FIG. 9 is a schematic block diagram illustrating one embodiment of an integrated battery management system.

FIG. 9 is a schematic block diagram illustrating one embodiment of an integrated battery management system 350. In one embodiment, the battery management system 105 may be integrated into the integrated battery management system 350. The integrated battery management system 350 may be fabricated as a single semiconductor device. In the depicted embodiment, the integrated battery management system 350 includes current protection circuits 355, voltage protection circuits 360, support circuits 370, logic 375, drivers 380, and the switches 205, 210, 215, 220.

The current protection circuits 355 may protect against an excessive current 240. The voltage protection circuits 360 may mitigate against an excessive voltage from the power supply 125 and/or the battery 120. The support circuits 370 may include oscillators, power supplies, adjustment controls, and the like.

The controller 245 may be embodied in the logic 375. The logic 375 may comprise semiconductor logic gates. In one embodiment, the logic 375 determines the function of the integrated battery management system 350, such as whether the integrated battery management system 350 will charge the battery 120 or will discharge the battery 120 to provide the current 240 to the load 115. In addition, the logic 375 may determine when and whether to turn the switches 205, 110, 215, 220 on or off. In one embodiment, the logic 375 communicates a value for each switch 205, 110, 215, 220 to the drivers 380. The drivers 380 may communicate a control signal to each of the switches 205, 110, 215, 220 and turn each switch 205, 110, 215, 220 on or off.

Figure 10:
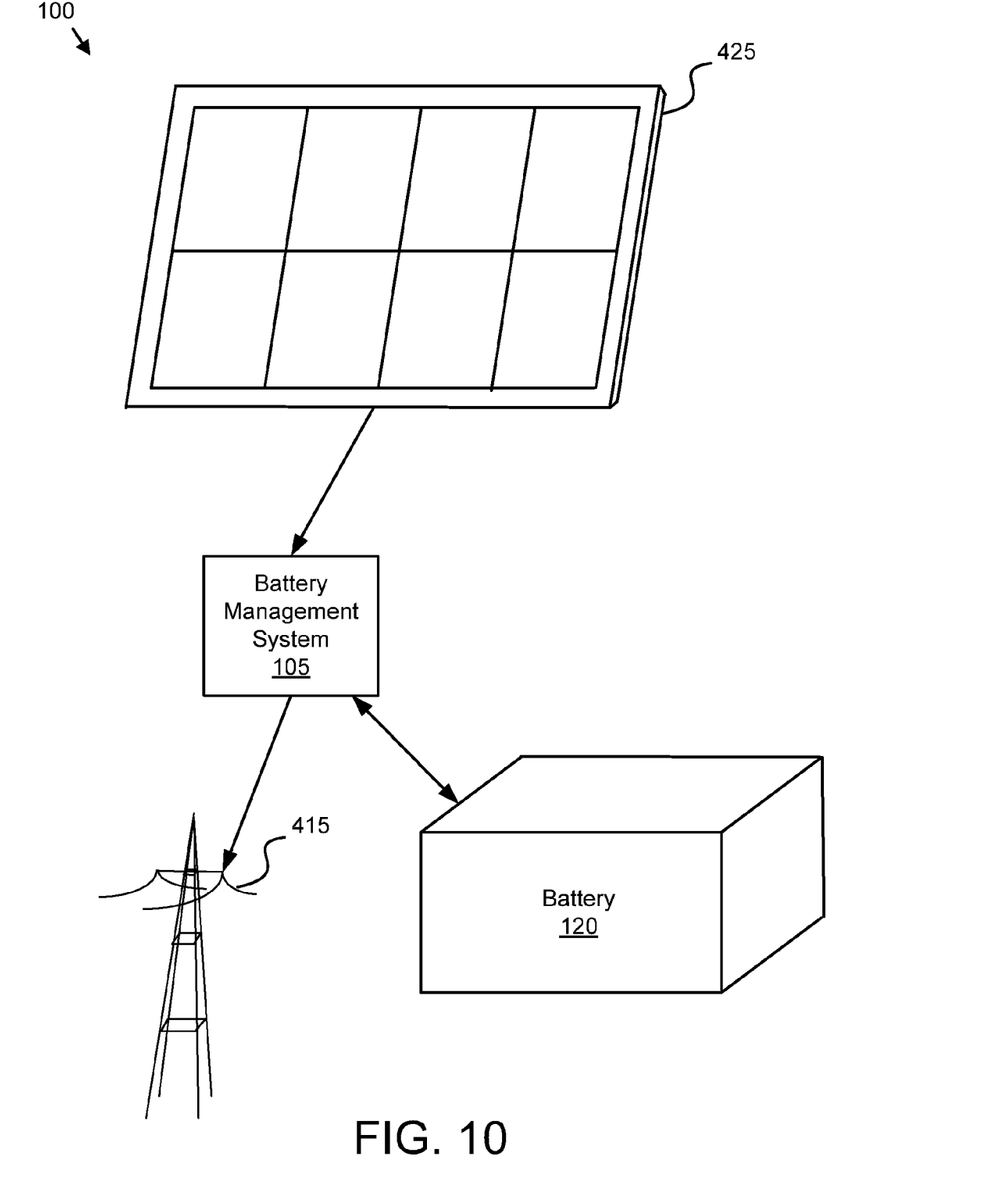
FIG. 10 is a drawing illustrating one specific embodiment of a battery system.

FIG. 10 is a drawing illustrating one embodiment of a battery system 100 using solar power. The power supply 125 of FIGS. 1 and 2 is depicted as a solar panel array 425. The solar panel array 425 may supply electric power to the electric grid 415 while the sun is shining. The electric grid 415 is one embodiment of the load 115 of FIGS. 1 and 2.

In addition, the battery management system 105 may use the electric power of the solar panel array 425 to charge the battery 120. During the night and/or cloudy weather, the solar panel array 425 generates no electric power. The battery management system 105 may discharge the battery 120 to supply the electric power to the electric grid 415.

The solar panel array 425 may have a lower operating voltage than the battery 120. Alternatively, the solar panel array 425 may have a higher operating voltage than the battery 120. The battery management system 105 may increase or decrease the voltage (VIN) of the solar panel array 425 to match the operating requirements of the battery 120.

In addition, the electric grid 415 may have a higher operating voltage than the battery 120. As a result, the battery management system 105 may increase the voltage of the electric power supplied to the electric grid 415. Alternatively, the electric grid 415 may have a lower operating voltage than a battery 120. The battery management system 105 may decrease the voltage of the electric power supplied from the battery 120 to the electric grid 415.

Figure 11:
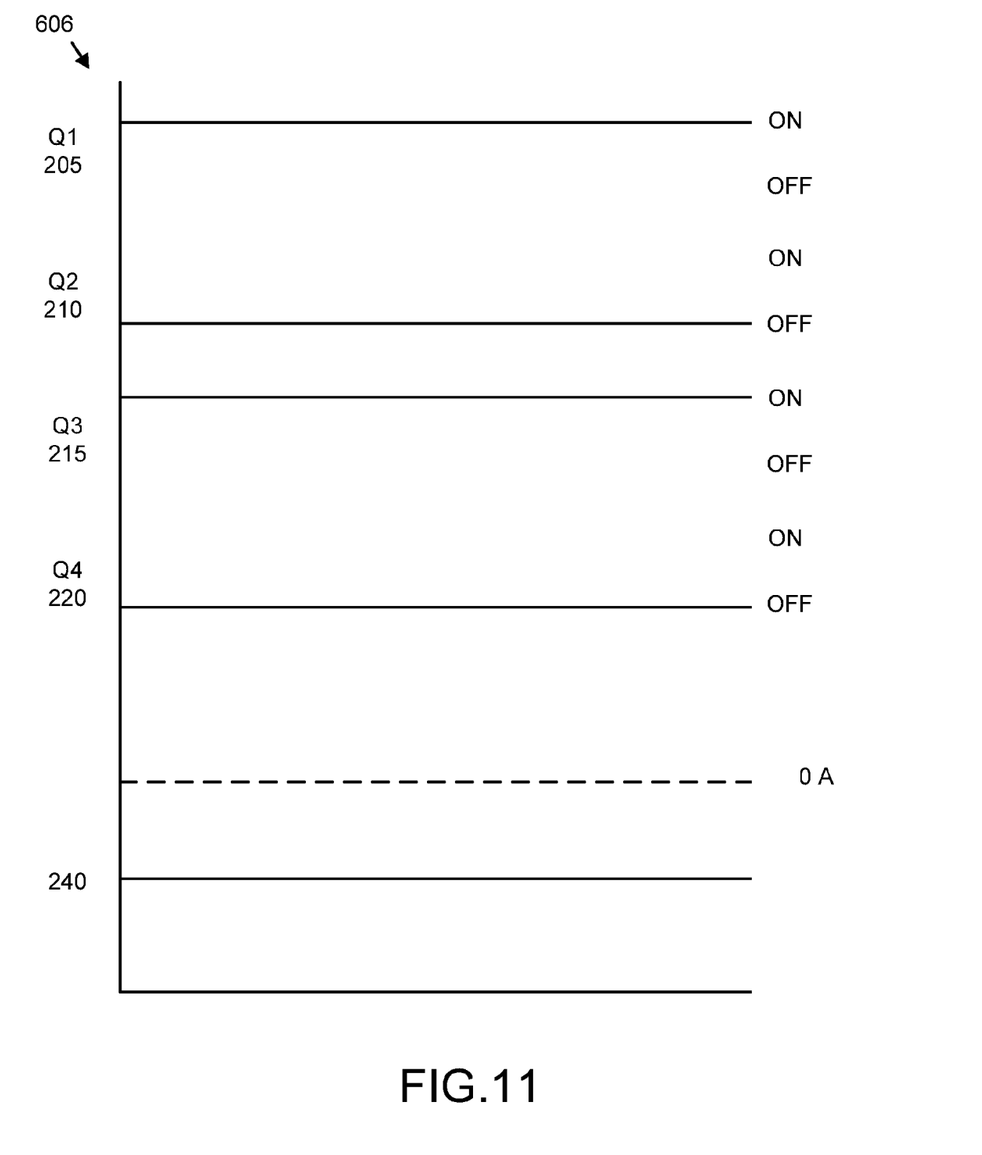
FIG. 11 is a diagram illustrating one alternative embodiment of switch states and current flow while charging a battery.

FIG. 11 is a diagram illustrating one alternate embodiment of switch states and current flow while charging a battery 606. In the depicted embodiment, the voltage of the power supply 125 or VIN is equal to the voltage of the battery 120 or VBAT. As a result, the first switch 205 and the third switch 215 are turned on while the second switch 210 and the fourth switch 220 are turned off.

Figure 12:
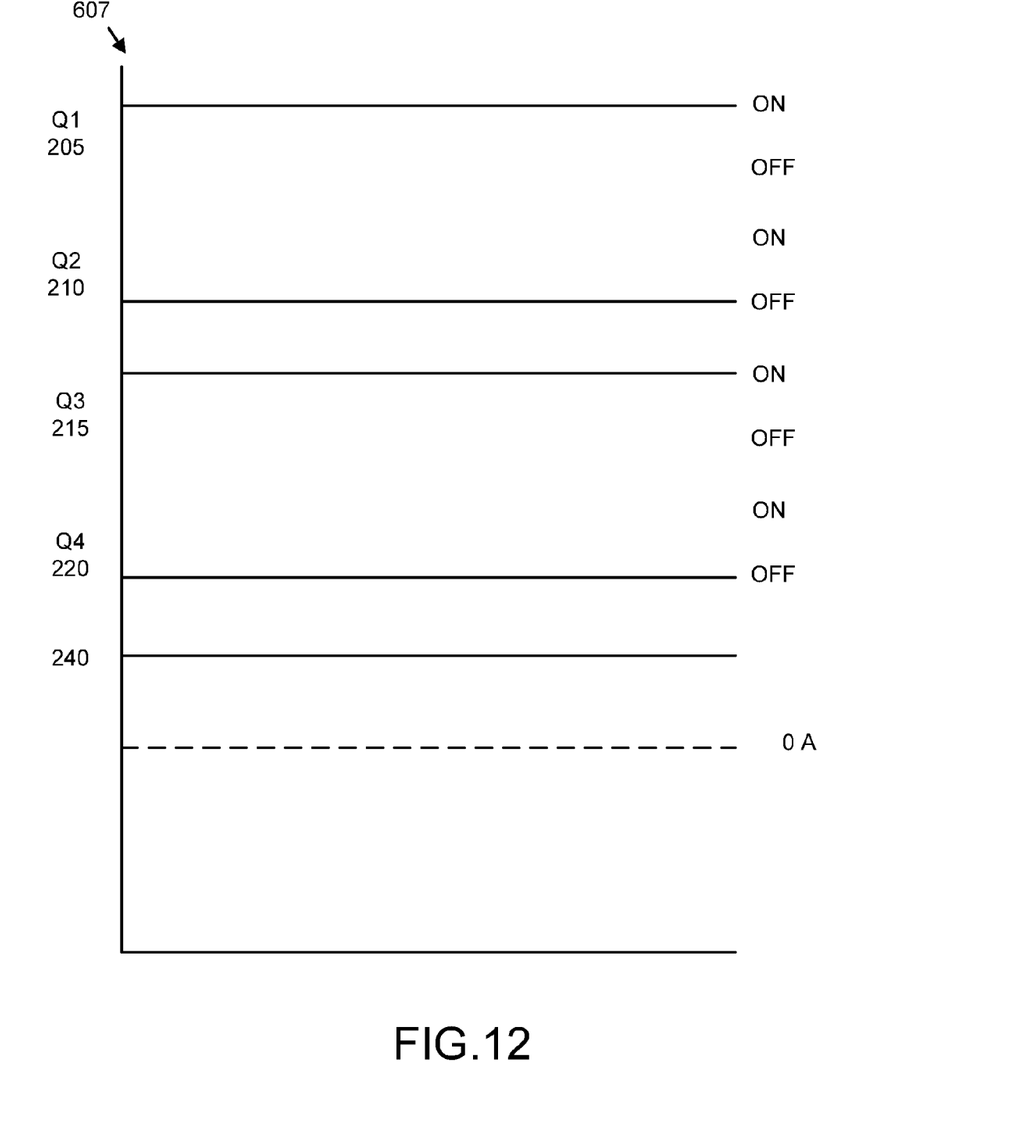
FIG. 12 is a diagram illustrating one alternative embodiment of switch states and current flow while discharging a battery.

FIG. 12 is a diagram illustrating one alternate embodiment of switch states and current flow while discharging a battery 607. In the depicted embodiment, the voltage of the battery 120 or VBAT is equal to the operating voltage of the load 115 or VOUT. As a result, the first switch 205 and the third switch 215 are turned on while the second switch 210 and the fourth switch 220 are turned off.

Figure 13:
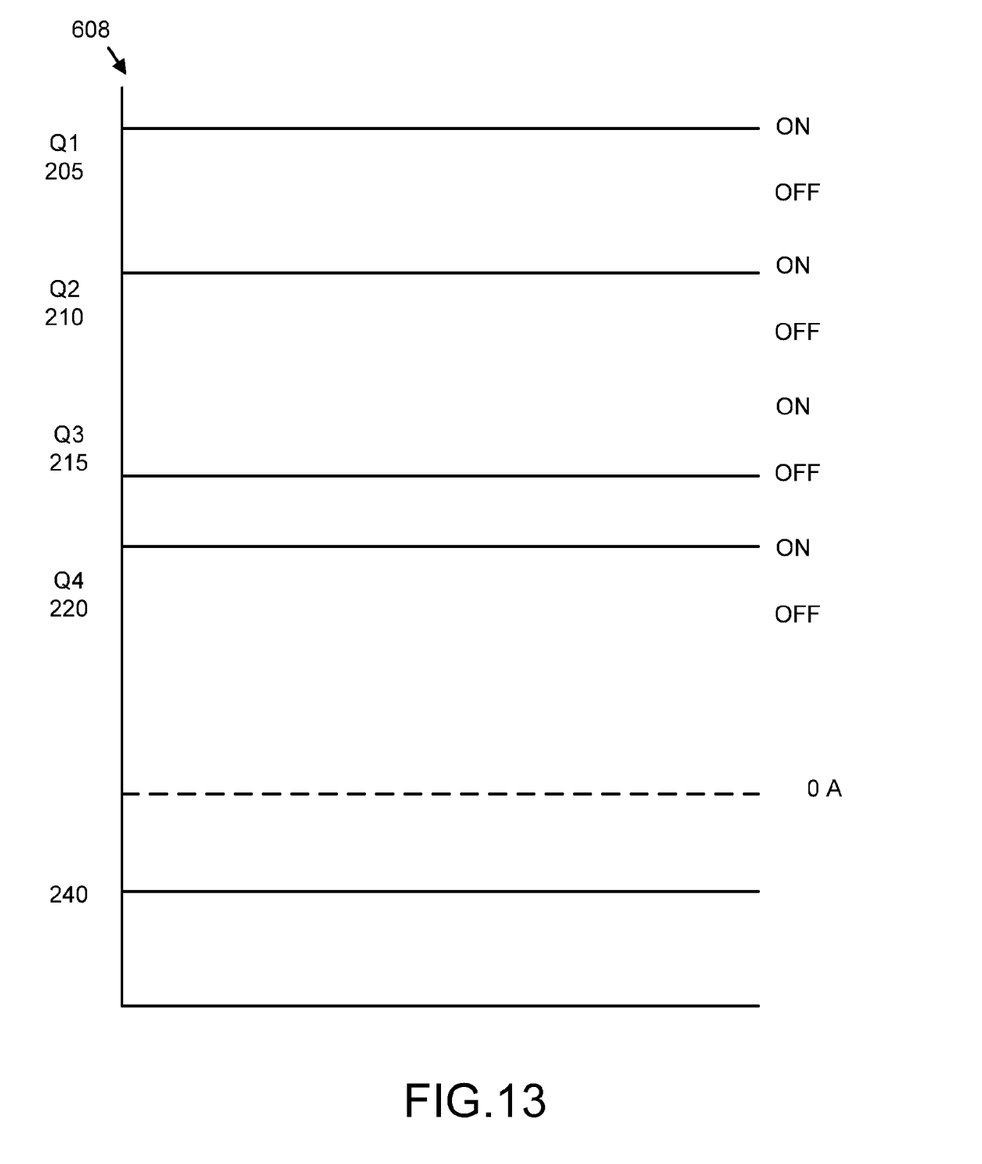
FIG. 13 is a diagram illustrating one embodiment of switch states for charge protection.

FIG. 13 is a diagram illustrating one embodiment of switch states for charge protection 608. In response to a short in one or more of the power supply 125 and the load 115, the first switch 205 is turned on, the second switch 210 is turned on, the third switch 215 is turned off, and the fourth switch 220 is turned on. As a result, the battery 120 is protected from the short, with the current 240 of the inductor 225 is discharged through the second switch 210 and the fourth switch 220. Thus the battery management system 105 protects the battery 120 from the short.

Figure 14:
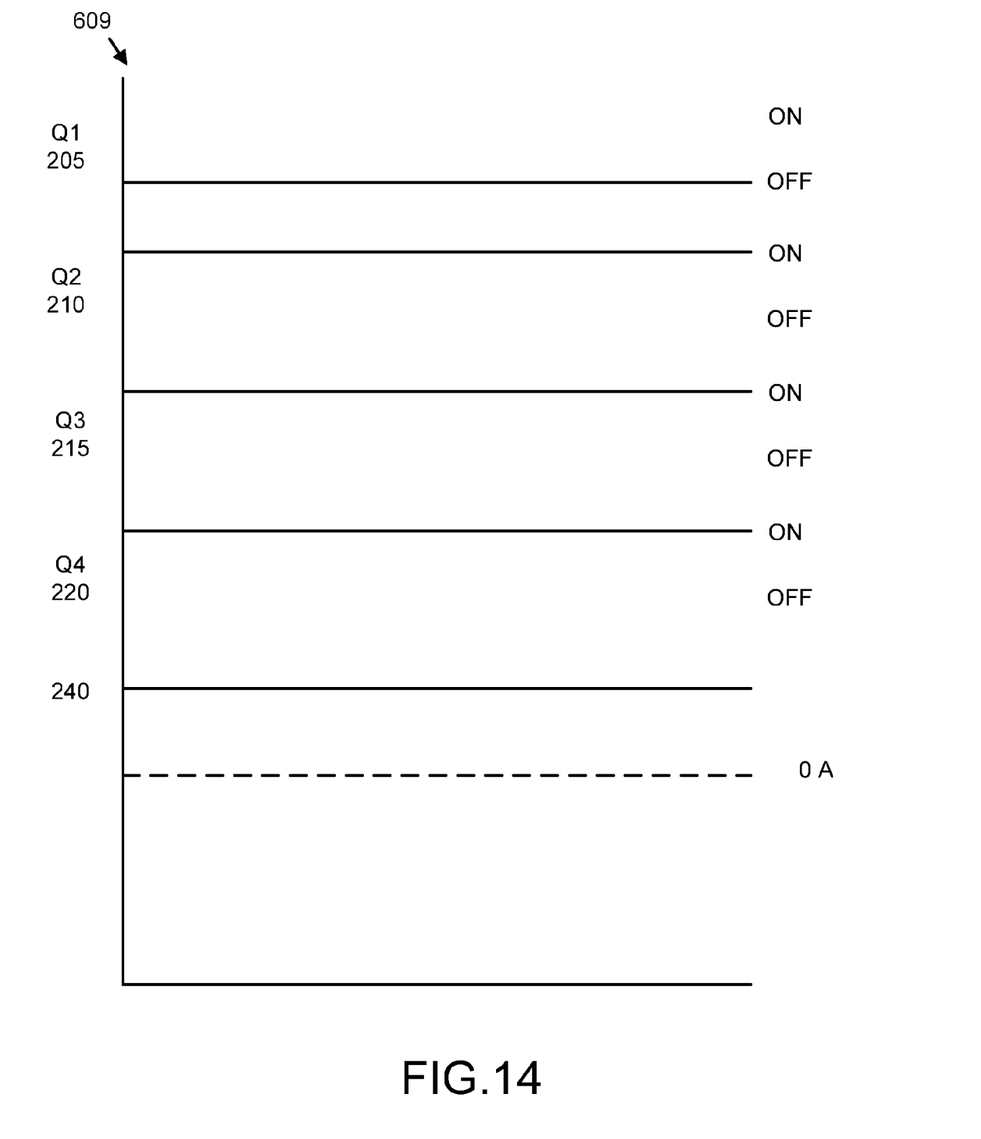
FIG. 14 is a diagram illustrating one embodiment of switch states for discharge protection.

FIG. 14 is a diagram illustrating one embodiment of switch states for discharge protection 609. In response to a short in the battery 120, the first switch 205 is turned off, the second switch 210 is turned on, the third switch 215 is turned on, and the fourth switch 220 is turned on. As a result, the power supply 125 and load 115 are protected from the short, with the current 240 of the inductor 225 is discharged through the second switch 210 and the fourth switch 220. Thus the battery management system 105 protects the power supply 125 and load 115 from the short.

By managing the routing of electric power from the power supply 125 to the battery 120 and from the battery 120 to the load 115 while increasing and decreasing voltages as needed by alternatively switching only two of the four switches 205, 210, 215, 220, the embodiments manage the battery 120 with reduced power loss. Thus the management of the battery 120 is more efficient.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:
1. An apparatus comprising:
  a Schottky diode electrically connected in a series to a power supply and a first connection;
  a capacitor electrically connected to the first connection and to a common;

a first switch electrically connected to the first connection and electrically connected to a second connection, wherein a load is electrically connected to the first connection;
an inductor with a proximal end electrically connected to the second connection and a distal end electrically connected to a third connection;
a second switch electrically connected to the second connection and electrically connected to the common;
a third switch electrically connected to the third connection and electrically connected to a battery;
a fourth switch electrically connected to the third connection and electrically connected to the common, wherein the first, second, third, and fourth switches each comprises a Field Effect Transistor in parallel with a diode;
semiconductor logic that switches the first, second, third, and fourth switches on and off, wherein semiconductor logic alternately switches the first switch and the second switch on, switches the third switch on, and switches the fourth switch off to charge the battery from the power supply in response to a power supply voltage being greater than a battery voltage;
the semiconductor logic alternately switches the third switch and the fourth switch on, switches the first switch is on, and switches the second switch is off to charge the battery from the power supply in response to a power supply voltage being less than a battery voltage;
the semiconductor logic detects one or more of a power supply short and a load short and switches the first switch on, the second switch on, the third switch off, and the fourth switch on in response to the one or more of the power supply short and the load short; and
the semiconductor logic detects a battery short and switches the first switch off, the second switch on, the third switch on, and the fourth switch on in response to the battery short.

2. The apparatus of claim 1, wherein semiconductor logic alternately switches the third switch and the fourth on, switches the first switch on, and switches the second switch off to discharge the battery to the load in response to a load voltage being less than a battery voltage and alternately switches the first switch and the second switch on, switches the third switch on, and switches the fourth switch off to discharge the battery to the load in response to a load voltage being greater than a battery voltage.

3. The apparatus of claim 1, wherein the switches are metal-oxide-semiconductor field-effect transistors (MOSFET) in parallel with the diode.

4. The apparatus of claim 1, wherein the diode is a Schottky diode, the semiconductor logic switches the first switch on, the second switch off, the third switch on, and the fourth switch off to charge the battery from the power supply off in response to the power supply voltage being equal to the battery voltage and switches the first switch on, the second switch off, the third switch on, and the fourth switch off to discharge the battery to the load in response to the battery voltage being equal to the load voltage.

5. A method comprising:
disposing a Schottky diode electrically connected in a series to a power supply and a first connection;
disposing a capacitor electrically connected to the first connection and to a common;
disposing a first switch with a first switch drain electrically connected to the first connection and a first switch source electrically connected to a second connection, wherein a load is electrically connected to the first connection;
disposing an inductor with a proximal end electrically connected to the second connection and a distal end electrically connected to a third connection;
disposing a second switch with a second switch source electrically connected to the second connection and a second switch drain electrically connected to the common;
disposing a third switch with a third switch source electrically connected to the third connection and a third switch drain electrically connected to a battery;
disposing a fourth switch with a fourth switch drain electrically connected to the third connection and a fourth switch source electrically connected to the common, wherein the first, second, third, and fourth switches each comprises a Field Effect Transistor in parallel with a diode;
alternately switching, using semiconductor logic, the first switch and the second switch on, switching the third switch on, and switching the fourth switch off to charge the battery from the power supply in response to a power supply voltage being greater than a battery voltage;
alternatley switching the third switch and the fourth switch on, switches the first switch is on, and switches the second switch is off to charge the battery from the power supply in response to a power supply voltage being less than a battery voltage;
detecting one or more of a power supply short and a load short;
switching the first switch on, the second switch on, the third switch off, and the fourth switch on in response to the one or more of the power supply short and the load short;
detecting a battery short; and
switching the first switch off, the second switch on, the third switch on, and the fourth switch on in response to the battery short.

6. The method of claim 5, the method further comprising the semiconductor logic alternatively switching the third switch and the fourth switch on, switching the first switch on, and switching the second switch off to discharge the battery to the load in response to a load voltage being less than a battery voltage and alternatively switching the first switch and the second switch on, switching the third switch on, and switching the fourth switch off to discharge the battery to the load in response to a load voltage being greater than a battery voltage.

7. The method of claim 5, wherein the switches are metal-oxide-semiconductor field-effect transistors (MOSFET) in parallel with a diode.

8. The method of claim 5, wherein the diode is a Schottky diode, the semiconductor logic switches the first switch on, the second switch off, the third switch on, and the fourth switch off to charge the battery from the power supply off in response to the power supply voltage being equal to the battery voltage and switches the first switch on, the second switch off, the third switch on, and the fourth switch off to discharge the battery to the load in response to the battery voltage being equal to the load voltage.

9. A system comprising:
a power supply;
a load;
a battery;
a battery management system comprising:

a Schottky diode electrically connected in a series to the power supply and a first connection;

a capacitor electrically connected to the first connection and to a common;

a first switch with a first switch drain electrically connected to the first connection and a first switch source electrically connected to a second connection, wherein the load is electrically connected to the first connection, the;

an inductor with a proximal end electrically connected to the second connection and a distal end electrically connected to a third connection;

a second switch with a second switch drain electrically connected to the second connection and a second switch source electrically connected to the common;

a third switch with a third switch source electrically connected to a third connection and a third switch drain electrically connected to the battery;

a fourth switch with a fourth switch drain electrically connected to the third connection and a fourth switch source electrically connected to the common, wherein the first, second, third, and fourth switches each comprises a Field Effect Transistor in parallel with a diode, wherein semiconductor logic alternately switches the first switch and the second switch on, switches the third switch on, and the fourth switch off to charge the battery from the power supply in response to a power supply voltage being greater than a battery voltage;

the semiconductor logic alternately switches the third switch and the fourth switch on, switches the first switch is on, and switches the second switch is off to charge the battery from the power supply in response to a power supply voltage being less than a battery voltage;

the semiconductor logic detects one or more of a power supply short and a load short and switches the first switch on, the second switch on, the third switch off, and the fourth switch on in response to the one or more of the power supply short and the load short; and the semiconductor logic detects a battery short and switches the first switch off, the second switch on, the third switch on, and the fourth switch on in response to the battery short.

10. The system of claim 9, wherein the semiconductor logic alternately switches the third switch and the fourth switch on, switches the first switch on, and switches the second switch off to discharge the battery to the load in response to a load voltage being less than a battery voltage and alternately switches the first switch and the second switch on, switches the third switch on, and switches the fourth switch off to discharge the battery to the load in response to a load voltage being greater than a battery voltage.

11. The system of claim 9, wherein the power supply is a solar panel array.

12. The system of claim 9, wherein the diode is a Schottky diode, the semiconductor logic switches the first switch on, the second switch off, the third switch on, and the fourth switch off to charge the battery from the power supply off in response to the power supply voltage being equal to the battery voltage and switches the first switch on, the second switch off, the third switch on, and the fourth switch off to discharge the battery to the load in response to the battery voltage being equal to the load voltage.

\* \* \* \* \*